United States Patent
Alrabady et al.

(10) Patent No.: US 7,818,403 B2
(45) Date of Patent: *Oct. 19, 2010

(54) SYSTEM FOR USING NON-STANDARD TRANSFER PROTOCOL FROM SOFTWARE RECEIVED AT CLIENT DEVICE FOR EXCHANGING DATA WITH IN-VEHICLE COMMUNICATIONS GATEWAY

(75) Inventors: Ansaf I. Alrabady, Livonia, MI (US); Thomas M. P. Catsburg, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 564 days.

This patent is subject to a terminal disclaimer.

(21) Appl. No.: 11/856,538

(22) Filed: Sep. 17, 2007

(65) Prior Publication Data

US 2009/0077267 A1    Mar. 19, 2009

(51) Int. Cl.
*G06F 15/16* (2006.01)
(52) U.S. Cl. ................. 709/219; 709/217; 709/218; 709/237
(58) Field of Classification Search ............ 709/203, 709/217, 218, 219, 227, 228, 237; 370/310
See application file for complete search history.

(56) References Cited

U.S. PATENT DOCUMENTS

| | | | |
|---|---|---|---|
| 5,732,074 A | 3/1998 | Spaur et al. | |
| 6,622,083 B1 | 9/2003 | Knockeart et al. | |
| 6,647,322 B1 | 11/2003 | Hayashi et al. | |
| 6,895,444 B1 | 5/2005 | Weisshaar et al. | |
| 6,975,612 B1 | 12/2005 | Razavi et al. | |
| 2002/0188665 A1* | 12/2002 | Lash | 709/203 |
| 2003/0078986 A1* | 4/2003 | Ayres et al. | 709/217 |
| 2004/0205153 A1* | 10/2004 | Weisshaar et al. | 709/217 |
| 2005/0091377 A1* | 4/2005 | Behrens et al. | 709/227 |
| 2005/0198363 A1 | 9/2005 | Ling et al. | |
| 2006/0106932 A9 | 5/2006 | Behrens et al. | |
| 2007/0005777 A1 | 1/2007 | Fremantle et al. | |
| 2007/0067415 A1 | 3/2007 | Kawaguchi | |
| 2008/0082627 A1* | 4/2008 | Allen et al. | 709/217 |
| 2008/0103781 A1 | 5/2008 | Wasson et al. | |
| 2008/0189359 A1 | 8/2008 | Sasaki et al. | |
| 2008/0267101 A1* | 10/2008 | Webb et al. | 370/310 |
| 2009/0077266 A1* | 3/2009 | Alrabady et al. | 709/249 |
| 2009/0077267 A1* | 3/2009 | Alrabady et al. | 709/249 |

FOREIGN PATENT DOCUMENTS

DE          10237715 A1    2/2004

* cited by examiner

*Primary Examiner*—Le Luu
(74) *Attorney, Agent, or Firm*—Ingrassia Fisher & Lorenz, P.C.

(57) ABSTRACT

Methods and apparatus are provided for transmitting data between a client device and a vehicle. A server hosted at an in-vehicle communications gateway module sends a software component comprising a non-standard transfer protocol module to a browser application hosted at the client device in response to a request from the client device. Standard ports at the in-vehicle communications gateway module and the client device are closed, and data is exchanged between the server and the browser application according to the non-standard transfer protocol. Optionally, the received data can then be transmitted from the in-vehicle communications gateway module to a computer module in the vehicle.

19 Claims, 7 Drawing Sheets

US 7,818,403 B2

SYSTEM FOR USING NON-STANDARD TRANSFER PROTOCOL FROM SOFTWARE RECEIVED AT CLIENT DEVICE FOR EXCHANGING DATA WITH IN-VEHICLE COMMUNICATIONS GATEWAY

CROSS REFERENCE TO RELATED APPLICATIONS

This application is related to U.S. patent application Ser. No. 11/856,538, filed Sep. 17, 2007, and U.S. patent application Ser. No. 11/856,536, filed Sep. 17, 2007.

TECHNICAL FIELD

Embodiments of the present invention generally relate to telematics, and some embodiments more particularly relate to implementing a mobile server for communicating data between a client device and a computer module in a vehicle.

BACKGROUND OF THE INVENTION

A telematics system is one that provides information to or from a mobile source (e.g., a vehicle), and often describes vehicle systems that combine GPS and cellular technologies with onboard electronics which allow a vehicle to provide information to a remotely located client device or to access numerous telematics services provided a remotely located client device. Telematics services can include safety, communication, vehicle diagnostic and entertainment features.

Desirable features and characteristics of the present invention will become apparent from the subsequent detailed description and the appended claims, taken in conjunction with the accompanying drawings and the foregoing technical field and background.

SUMMARY OF THE INVENTION

A method is provided for transmitting data between a client device and a vehicle. According to this method a server hosted at an in-vehicle communications gateway module sends a software component comprising a non-standard transfer protocol module to a browser application hosted at the client device in response to a request from the client device. Standard ports at the in-vehicle communications gateway module and the client device are closed, and data is exchanged between the server and the browser application according to the non-standard transfer protocol. Optionally, the received data can then be transmitted from the in-vehicle communications gateway module to a computer module in the vehicle.

An in-vehicle communication gateway module is provided which includes a server designed to transmit a software component comprising a non-standard transfer protocol module to a browser application hosted at a client device in response to a request from the client device. After transmitting the software component, the in-vehicle communications gateway module closes a standard port. The in-vehicle communication gateway module also includes a communications module designed to exchange data with a computer module in the vehicle, and to exchange the data between the server and the browser application according to the non-standard transfer protocol.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
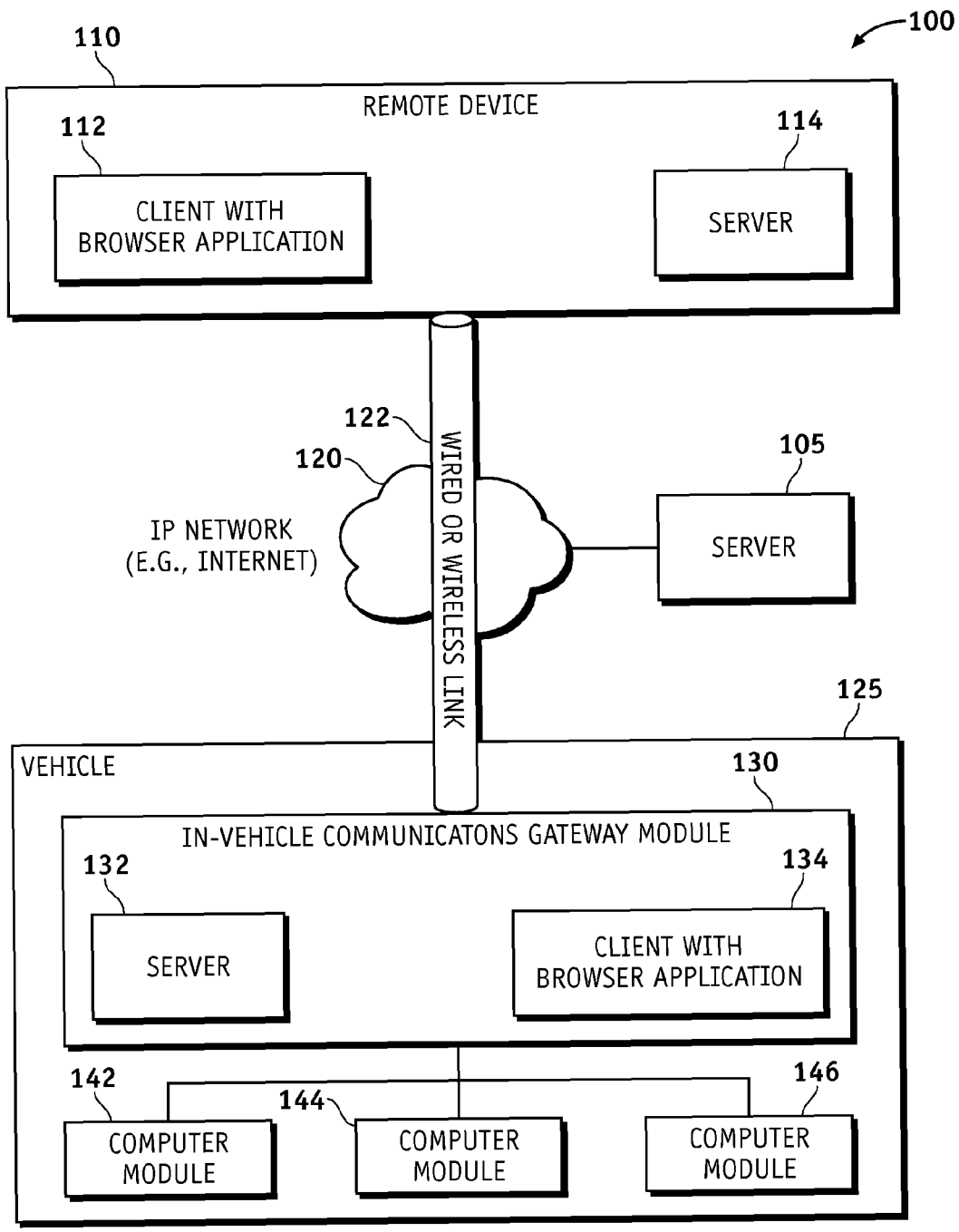
FIG. 1 is a block diagram of a telematics communication network including a remote client device and a vehicle.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Any embodiment described herein is not necessarily to be construed as preferred or advantageous over other embodiments. All of the embodiments described in this detailed description are illustrative provided to enable persons skilled in the art to make or use the invention and not to limit the scope of the invention which is defined by the claims.

Before describing in detail embodiments that are in accordance with the present invention, it should be observed that the embodiments reside primarily in combinations of method steps and apparatus components related to communicating data between a client device and a computer module in a vehicle. Accordingly, the apparatus components and method steps have been represented where appropriate by symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises,"

"comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for communicating data between a client device and a computer module in a vehicle, as described herein. The non-processor circuits may include, but are not limited to, a radio receiver, a radio transmitter, signal drivers, clock circuits, power source circuits, and user input devices. As such, these functions may be interpreted as steps of a method for communicating data between a client device and a computer module in a vehicle. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

Terminology

As used herein, the term "vehicle" broadly refers to a non-living transport mechanism. Examples of vehicles include automobiles such as buses, cars, trucks, sport utility vehicles, vans, vehicles that do not travel on land such as mechanical water vehicles including watercraft, hovercraft, sailcraft, boats and ships, mechanical under water vehicles including submarines, mechanical air vehicles including aircraft and spacecraft, mechanical rail vehicles such as trains, trams and trolleys, etc. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

Exemplary Telematics Network

FIG. 1 is a block diagram of a telematics communication network 100 including a remote client device 110 and a vehicle 125.

The vehicle 125 includes an in-vehicle communications gateway module 130 and a number of computer modules 142, 144, 146 in the vehicle 125. The in-vehicle communications gateway module 130 communicates with other computer modules 142, 144, 146 in the vehicle 125 via an internal vehicle network. The in-vehicle communications gateway module 130 communicates with the remote client device 110 via a network such as the Internet or other IP network.

A client device 110 can be, for example, a personal computer, a laptop computer, a handheld computer such as a personal digital assistant (PDA), or a wireless communication device such as cellular telephone. While client devices are generally located remotely with respect to the location of the vehicle 125, there is no restriction on the location of the client device 110. The term "client device" generally refers to any computing device which can communicate over an IP network 120 (e.g., Internet) via a web browser application 112, such as Internet Explorer. Some client devices also include a server 114.

The computer modules 142, 144, 146 can generally be any in-vehicle computer module that can receive data, transmit data and/or process or manipulate data according to a list of instructions. Non-limiting examples of computer modules include, for example, a power train controller module, a body control module, a door control module, a keyless entry module, an anti-lock brake control module, a sensing and diagnostic module, a instrument panel module, a navigation module, a transfer case control module, a radio module, airbag module, rain sensor module, etc.

The in-vehicle communications gateway module 130 generally refers to a computer hardware and/or software modules which serve as a gateway for communications to or from one or more remote client devices 110, and for communications to or from one or more computer modules 142, 144, 146 inside the vehicle 125. The in-vehicle communications gateway module 130 can be implemented, for example, using a communications module such as a flexible computer platform module (FCPM), a telematics module, etc. Among other functions, the in-vehicle communications gateway module 130 manages interfaces to remote client devices 110, and provides status updates between the remote client devices 110 and the computer modules 142, 144, 146 inside the vehicle 125.

The in-vehicle communications gateway module 130 also includes a server 132 which allows the in-vehicle communications gateway module 130 to communicate with the client device 110 over a wired or wireless link 122. The destination or origin HTTP server 132 stores or creates resources such as HTML files and images. As used herein, the term "server" refers to a computer that is responsible for accepting requests from clients, which are known as "web browsers," and serving them responses along with optional data contents, which usually are web pages such as HTML documents and linked objects (images, etc.) or other files. There may be several intermediaries, such as proxies, gateways, and tunnels between the HTTP client and HTTP server. A server typically includes hardware, operating system, server software (IIS, Apache, etc.) that manages requests from the browser and delivers web pages (HTML documents and files) in response, FTP server software for file downloads, SMTP server software for e-mail service, and site content (e.g., web pages and other files). A server also executes server-side scripts (CGI scripts, JSPs, ASPs, etc.). If the server is used internally and not by the public, it may be called an "intranet server."

The in-vehicle communications gateway module 130 also includes a client with a web browser application 134 which allows the in-vehicle communications gateway module 130 to communicate with a server 114 running at the client device 110. As used herein, the term "web browser" refers to a software application that enables a user to display and interact with text, images, and other information typically located on a web page at a website on the Internet or a local area network. Examples of web browsers include Internet Explorer, Mozilla Firefox, Safari, Opera, and Netscape. Web browsers communicate with servers to fetch webpages from servers and/or to submit information to servers. Text and images on a Web page can contain hyperlinks to other Web pages at the same or different website. Web browsers allow a user to quickly and easily access information provided on many Web pages at many websites by traversing these links. Although browsers are typically used to access the Internet, they can also be used to access information provided by servers in private networks or content in file systems.

The in-vehicle communications gateway module 130 can also perform, for example, wireless connectivity functions, security functions, and provide many services such as remote reflash, remote diagnostics, media transfer to the vehicle, playlists, address books, map updates, software module updates, etc.

Conventional Mobile Server

Telematics systems have been proposed which allow for an in-vehicle communications gateway module 130 to function as a vehicle-side server 132 which also acts as a telecommunication controller for in-vehicle computer modules 142, 144, 146. For example, U.S. Pat. No. 5,732,074 to Cellport Systems discloses using a dedicated controller in the vehicle as a server. In this system, the vehicle-side server 132 acts as a gateway to vehicle automotive buses which allow the vehicle 125 to connect to the Internet 120, and standard transfer protocols are used to exchange information between the vehicle-side server 132 and the remote client device 1 10. As used herein, the term "standard transfer protocol" or "standard Internet protocol" refers to a data exchange protocol which implements a HTTP layer over a TCP layer over an IP layer (in that order as HTTP-over-TCP-over-IP) as part of a protocol stack for exchanging data between a client and a server, as will now be described below with reference to FIG. 2.

Figure 2:
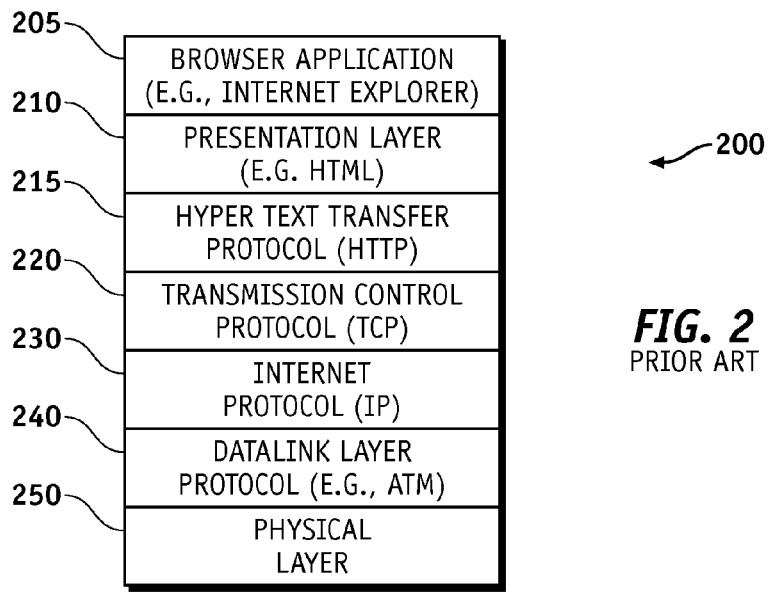
FIG. 2 is a standard protocol stack used for exchanging data between the client device and the in-vehicle communications gateway module according to a conventional approach.

FIG. 2 is a standard protocol stack 200 used for exchanging data between the client device 110 and the in-vehicle communications gateway module 130 according to a conventional approach. As used herein, a protocol stack (sometimes also referred to as a communications stack) refers to a particular software implementation of a computer networking protocol suite. The protocol suite defines the protocols, and the protocol stack is the software implementation of those protocols.

As illustrated in FIG. 2, the protocol stack 200 includes application layers 205, 210, 215 which include a browser application 205 (e.g., Internet Explorer), a presentation layer 210 such as HTML, and a session layer 215 where the Hyper Text Transfer Protocol (HTTP) is implemented. As used herein, the term "Hyper Text Transfer Protocol (HTTP)" refers to a request/response protocol between clients and servers which is used to transfer or convey information on the Internet. RFC 2616 (1999) defines HTTP/1.1, the version of HTTP in common use today. The term "server" refers to a computer that is responsible for accepting HTTP requests from clients, which are known as "web browsers," and serving them HTTP responses along with optional data contents, which usually are web pages such as HTML documents and linked objects (images, etc.) or other files. A server typically includes hardware, operating system, HTTP server software (IIS, Apache, etc.) that manages requests from the browser and delivers web pages (HTML documents and files) in response.

The protocol stack 200 also includes a transport layer 220 where the Transmission Control Protocol (TCP) is implemented, and an Internet Protocol (IP) layer 230. The Transmission Control Protocol (TCP)/Internet Protocol (IP) protocol suite is the set of communications protocols that implement the protocol stack on which the Internet and most commercial networks run. The transport layer 220 responds to service requests from the application layer and issues service requests to the IP or "Internet" layer 230. TCP ensures reliable and effective data transfer by dividing information into pieces and adding destination addresses to each piece, while IP uses the address in each piece to route the piece to a particular destination. In the TCP/IP model, the transport layer is responsible for delivering data to the appropriate application process on the host computers. The transport layer controls the reliability of a given link through flow control, segmentation/desegmentation, and error control. This involves statistical multiplexing of data from different application processes, i.e. forming data packets, and adding source and destination port numbers in the header of each transport layer data packet. Together with the source and destination IP address, the port numbers constitutes a network socket, (e.g., an identification address of the process-to-process communication). TCP provides end-to-end reliable communication (e.g., error recovery by means of error detecting code and automatic repeat request (ARQ) protocol). The ARQ protocol also provides flow control, which may be combined with congestion avoidance. TCP is used, for example, in HTTP web browsing and email transfer.

The protocol stack 200 also includes a data link layer 240 and a physical layer 250.

Thus, in the standard protocol stack 200 of FIG. 2, HTTP 215 is implemented on top of TCP/IP 220, 230. Operation of the conventional HTTP/TCP/IP protocol stack 200 is well-understood by those skilled in the art, and will not be described in further detail herein.

Figure 3:
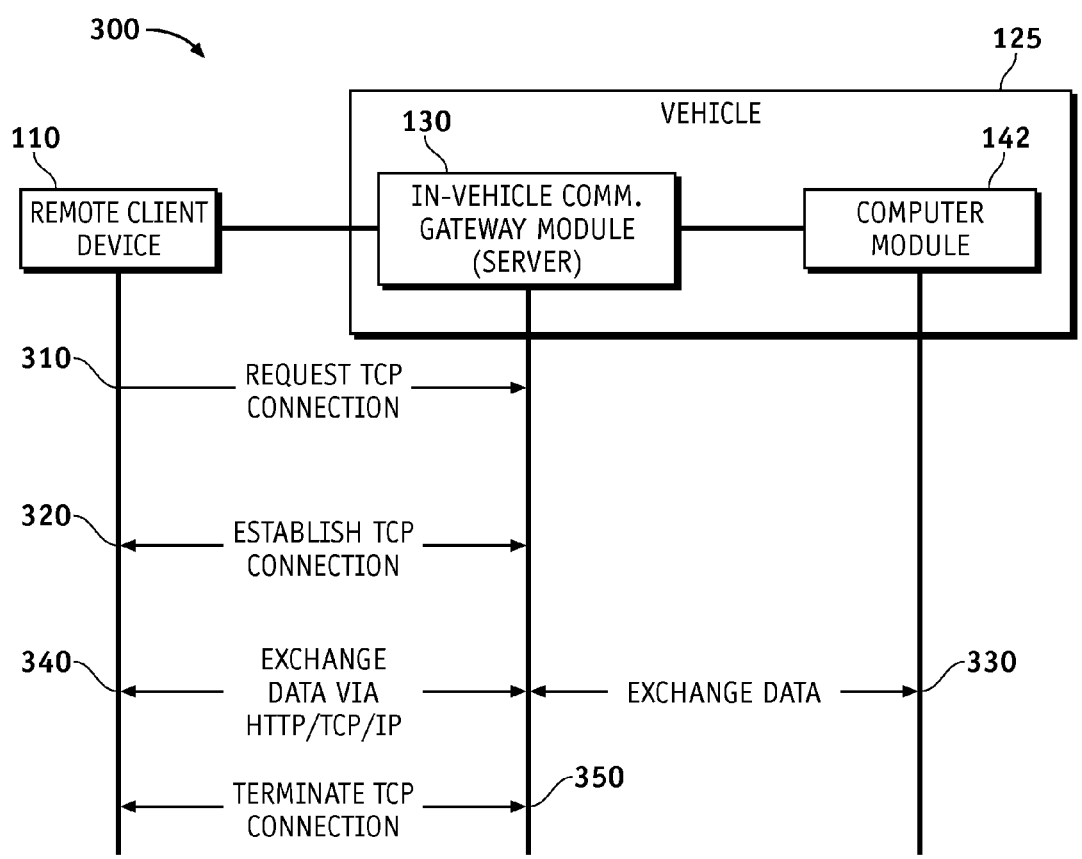
FIG. 3 is a simplified message flow diagram for communicating data to the remote client device from a server at the in-vehicle communications gateway module according to one conventional approach.

FIG. 3 is a simplified message flow diagram 300 for communicating data to the remote client device 110 from a server 132 at the in-vehicle communications gateway module 130 according to one conventional approach. At step 310, to initiate a session, a browser application 112 (or other end-user tool) at the originating HTTP client device 110 sends a TCP connection request to the in-vehicle communications gateway module 130, and at step 320, the client device 110 establishes a TCP connection to a standard port (e.g., port 80) of the in-vehicle communications gateway module 130. Techniques for establishing a TCP connection are well-known in the art and will not be described further herein.

At step 330, the computer module 142 provides the requested data to HTTP server 132 at the in-vehicle communications gateway module 130, and at step 340, the HTTP server 132 serves the data (via standard port 80 of the HTTP server 132) to remote HTTP client device 110 according to standard Internet protocols (e.g. HTTP-over-TCP-over-IP). For purposes of illustration, the data exchanges between 142 and 130 and between 110 and 130 are both illustrated using one arrow; however, it will be appreciated that in reality, each of the data exchanges may involve at least one request, and multiple responses and acknowledgements between each pair of entities. A response to a single request can also sometimes involve multiple exchanges between the entities. For example, although not illustrated in FIG. 3, the in-vehicle communications gateway module 130 may communicate multiple data requests to the computer module 142, and the computer module 142 may reply back to the in-vehicle communications gateway module 130 (via an in-vehicle network) with the requested data.

In a simplified example of data exchange 340, when the HTTP server 132 receives a request message from the HTTP client 110, the HTTP server 132 sends back a status line, such as "HTTP/1.1 200 OK", and a message of its own, the body of which is perhaps the requested file or some other information. For simplicity of illustration, these exchanges are shown using a single arrow. In addition, it will be appreciated that in many cases the data exchange between the browser application 112 of the HTTP client device 110 and the HTTP server 132 at the in-vehicle communications gateway module 130 typically involves one or more HTTP request messages (sometimes referred to as a HTTP_GET messages) from the HTTP client 110 to the HTTP server 132, and a plurality of HTTP reply messages from the HTTP server 132 to the browser 112 (sometimes referred to as a HTTP_200_OK and HTTP_Continue messages with segments of the requested data), and other messages such as acknowledgements (ACKs) from the HTTP client 110 to the HTTP server 132 in response to the HTTP_Continue messages. As such, although data exchange 340 is represented with a double-headed arrow, those skilled in the art will appreciate that the data exchange between the browser application 112 of the HTTP client device 110 and the HTTP server 132 at the in-vehicle communications gateway module 130 will likely involve multiple exchanges.

Once the data exchange between the browser application 112 of the HTTP client device 110 and the HTTP server 132 at the in-vehicle communications gateway module 130 is complete, at step 350, the TCP connection between the remote HTTP client device 110 and the in-vehicle communications gateway module 130 is terminated.

Overview of Exemplary Embodiments

Notwithstanding these techniques, it would be desirable to provide alternative system and method which do not require the use of "standard transfer protocols" or "standard Internet protocols" (i.e., a HTTP-over-TCP-over-IP protocol stack) to exchange data between a client and a server.

In accordance with embodiments disclosed herein, techniques are provided which can allow a remote device and an in-vehicle communication gateway module to exchange data without using HTTP-over-TCP-over-IP as the transfer protocol for exchanging data between those entities. This allows for use of particular, non-standard transfer protocols and non-standard ports during data exchange in a telematics network.

Figure 4:
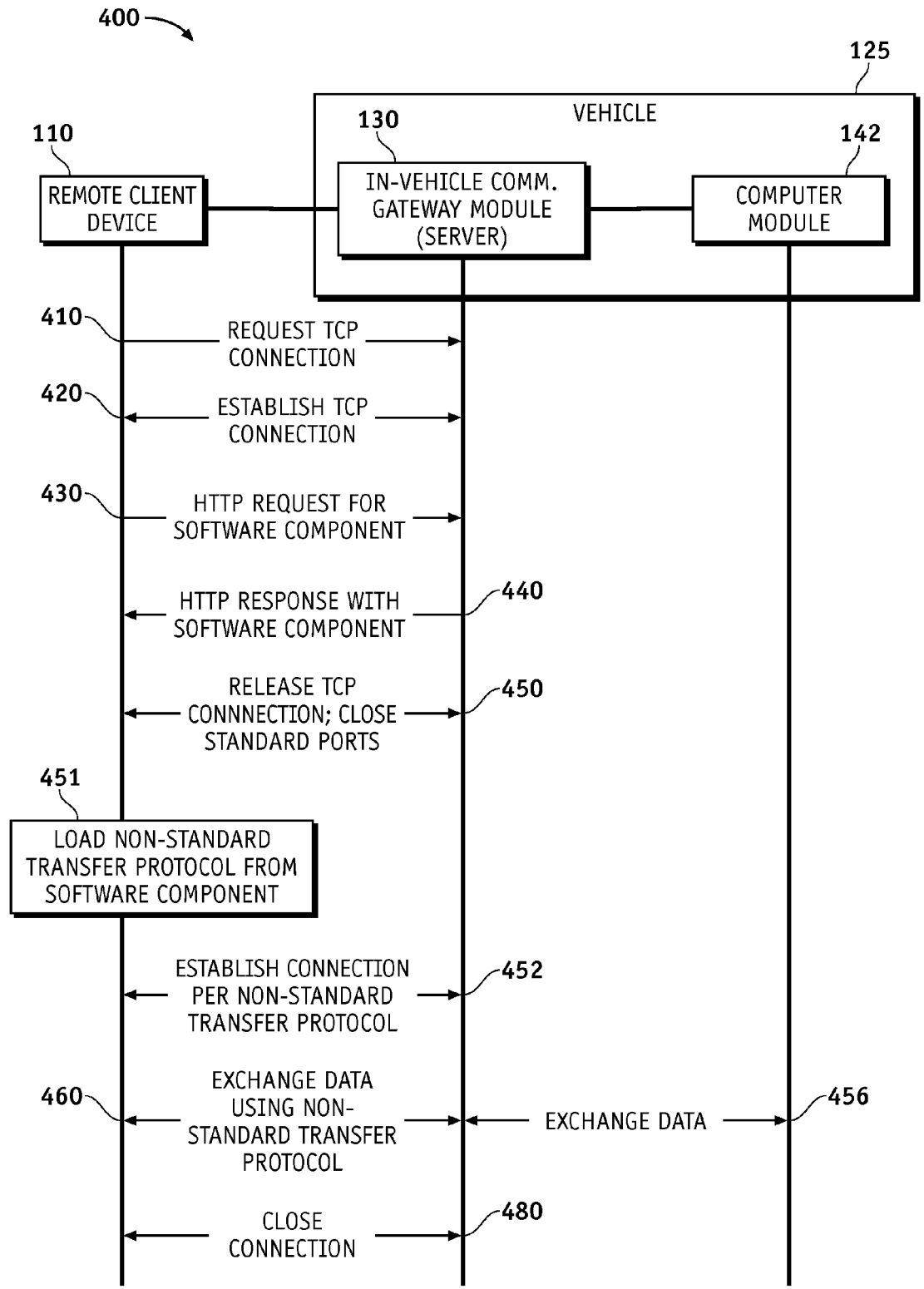
FIG. 4 is a simplified message flow diagram for exchanging data between the client device and the in-vehicle communications gateway module when the client device requests data from an in-vehicle computer module in accordance with some embodiments of the invention.

FIG. 4 is a simplified message flow diagram 400 for exchanging data between the client device 110 and the in-vehicle communications gateway module 130 in accordance with some embodiments of the invention when the client device 110 requests data from an in-vehicle computer module 142. The scenario in FIG. 4 will be described with reference to a scenario where the client device 110 is requesting data from computer module 142 in the vehicle 125; however, it will be appreciated that the data exchange of FIG. 4 is not limited to that specific scenario.

At step 410, the client device 110 sends a TCP connection request to the in-vehicle communications gateway module 130, and at step 420, the client device 110 and in-vehicle communications gateway module 130 establish a TCP connection. For example, in one implementation, the in-vehicle communications gateway module 130 receives a request for a HTTP service from the client device 110 on a standard port (e.g. HTTP port 80) of the in-vehicle communications gateway module 130. Techniques for establishing a TCP connection are well-known in the art and will not be described further herein.

At step 430, browser application 112 of the client device 110 sends an HTTP request message for a software component to the server 132 at the in-vehicle communications gateway module 130. As described below, the software component or "module" includes a particular, non-standard transfer protocol module stack for use during subsequent data communications between browser application 112 of the client device 110 and the server 132 at the in-vehicle communications gateway module 130.

At step 440, the in-vehicle communications gateway module 130 sends an HTTP response message to the client device 110 which includes a software component. The software component includes algorithms in the form of an executable program which include a particular, non-standard transfer protocol stack. The "software component" can be implemented, for example, using a browser downloadable executable program such as a Java applet, an active X control, or a compiled program (if downloaded first and executed subsequently).

Thus, during this session initiation phase, the server application 132 in the in-vehicle communications gateway module 130 is used as a standard web interface. For example, when a remote user initiates a session by entering a URL corresponding to the vehicle 125 into the browser application 112 running on the remote client device 110 (e.g., user types http://10.11.12.13 into a browser application 112 where the imaginary 10.11.12.13 represents the vehicle 125), the server 132 at the vehicle 125 responds with a "web page" which begins the download of the software component from the vehicle 125 to the remote client device 110.

When the in-vehicle communications gateway module 130 sends the software component to the remote client device 110, at step 450, the in-vehicle communications gateway module 130 and the client device 110 close their standard HTTP ports to terminate the HTTP session and release their TCP connection. This way "standard" internet protocols (the conventional HTTP/TCP/IP protocol stack of FIG. 2) are not used for the subsequent exchange of information between the in-vehicle communications gateway module 130 and the remote client device 110.

At step 451, the client device 110 loads and executes the software component which includes the particular, non-standard transfer protocol module. Once executed by the remote client device 110, the particular, non-standard protocol stack allows the remote client device 110 to communicate with the in-vehicle communications gateway module 130 using the particular non-standard transfer protocol. This way, when the browser application 112 loads and executes the executable program and runs it on the remote client device 110, the remote client device 110 knows how to communicate with the in-vehicle communications gateway module 130 according to the rules of the particular, non-standard transfer protocol. As will be described below, the particular, non-standard transfer protocol stack included in the software component or module can vary greatly depending on the particular implementation. Regardless of the particular implementation, when a "non-standard" transfer protocol is used to exchange data between the in-vehicle communications gateway module 130 and the remote device 110, the conventional HTTP/TCP/IP protocol stack of FIG. 2 is not used by the in-vehicle communications gateway module 130 and the remote device 110 to exchange data during subsequent communications.

After the client device 110 loads the particular, non-standard transfer protocol stack from the software component, the client device 110 is ready to communicate and exchange data with the in-vehicle communications gateway module 130 according to the particular, non-standard transfer protocol. At step 452, the client device 110 and the in-vehicle communications gateway module 130 establish a new connection according to the particular, non-standard transfer protocol.

At step 456, the in-vehicle communications gateway module 130 communicates a data request to the computer module 142, and the computer module 142 sends the requested data to the in-vehicle communications gateway module 130 over an in-vehicle network. Notably, any protocol can be used to exchange data between the in-vehicle communications gateway module 130 and the computer module 142 (i.e., it is not necessary to follow the particular, non-standard transfer protocol).

At step 460, the server 132 at the in-vehicle communications gateway module 130 exchanges the data which it received from the computer module 142 with the browser application 112 that running at the client device 110 in accordance with the particular, non-standard transfer protocol. Once the data exchange is complete (i.e., after the browser application 112 that running at the client device 110 receives the data it requested from computer module 142), at step 480, the client device 110 and the in-vehicle communications gateway module 130 close the new connection.

Non-Standard Transfer Protocol

As mentioned above, the software component is used to provide client device 110 with the particular, non-standard transfer protocol module stack for use during subsequent communications between the in-vehicle communications gateway module 130 and the remote client device 110. The particular, non-standard transfer protocol module stack allows the client device 110 to communicate according to the particular, non-standard transfer with the in-vehicle communications gateway module 130 and vice-versa.

As used herein, the term "non-standard transfer protocol" generally refers to a data exchange protocol other than a standard transfer protocol for exchanging data between a client and a server. A non-standard transfer protocol stack can generally include one or more layers/protocols not included in the standard protocol stack illustrated in FIG. 2, and this new layer/protocol can be implemented "in place of" one or more layers/protocols of the standard protocol stack illustrated in FIG. 2 and/or "in addition to" one or more layers/protocols of the standard protocol stack illustrated in FIG. 2 such that non-standard transfer protocol stack does not implement HTTP-over-TCP-over-IP as part of the transfer protocol used for exchanging data between a client and a server. For example, in one implementation of a "non-standard" transfer protocol stack, the protocol stack 200 of FIG. 2 can be modified such that it includes one or more new layers or protocols which differ from the conventional HTTP/TCP/IP protocol stack of FIG. 2 and/or are not included in the conventional HTTP/TCP/IP protocol stack 200 of FIG. 2.

In one, non-limiting implementation of a non-standard transfer protocol stack, one or more layers or protocols can be implemented between HTTP and TCP or between TCP and IP, etc. to implement a non-HTTP/TCP/IP data exchange protocol.

In another, non-limiting implementation, the HTTP layer used in a standard transfer protocol of FIG. 2 can be replaced with a custom-designed or proprietary protocol that supports connection oriented request/response messaging with error detection and an automatic repeat request (ARQ) mechanism to provide end-to-end reliable communication (e.g., error recovery by means of error detecting code and automatic repeat request (ARQ) protocol).

One exemplary implementation of the particular, non-standard transfer protocol module stack will now be described below with reference to FIG. 5.

Exemplary Non-Standard Transfer Protocol Stack

Figure 5:
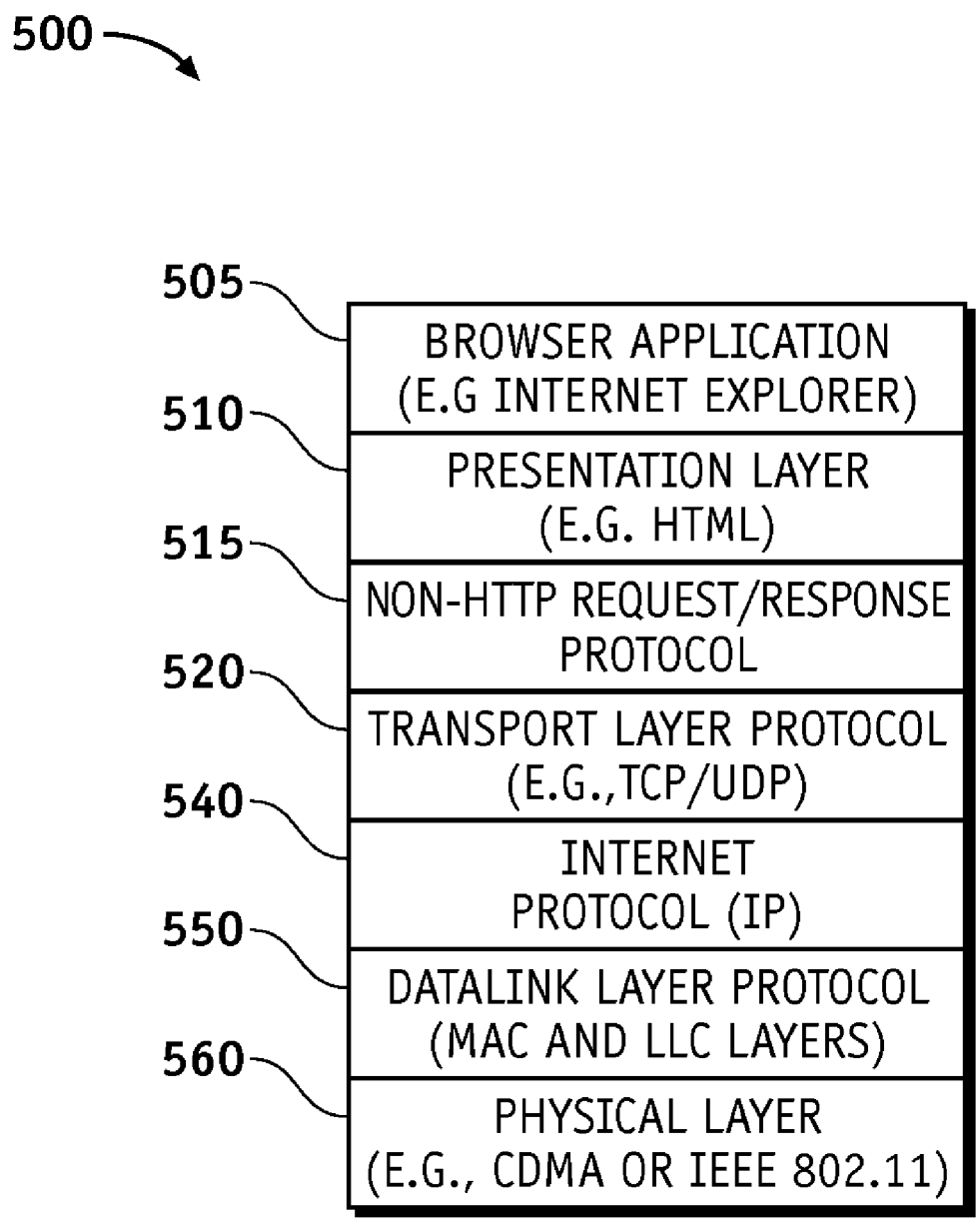
FIG. 5 is an exemplary non-standard transfer protocol stack used for exchanging data between the client device and the in-vehicle communications gateway module in accordance with some embodiments of the invention.

FIG. 5 is an exemplary non-standard transfer protocol stack 500 used for exchanging data between the client device 110 and the in-vehicle communications gateway module 130 in accordance with some embodiments of the invention. The exemplary communications protocol stack 500 includes application layers 505, 510, 515 including a browser application (e.g., Internet Explorer), a presentation layer 510 (e.g., HTML) and a non-HTTP request/response protocol layer 515; a transport layer protocol 520 (such as TCP, UDP, etc.); an Internet layer 540 which implements the Internet Protocol (IP); a datalink layer 550 which can include medium access control (MAC) and link layer control (LLC) sub-layers (not shown) and which can implement any datalink layer protocol including Ethernet datalink layer protocol, IEEE 802.11 datalink layer protocol, a cellular datalink layer protocol, a satellite datalink layer protocol, or any other wireless datalink layer protocol; and a physical layer 560 which can implement any physical layer standard including a cellular network physical layer (e.g., UMTS, WCDMA, CDMA, AMPS), a satellite physical layer, Ethernet, IEEE 802.11, IEEE 802.16 (also known as WiMAX), etc.

Figure 6:
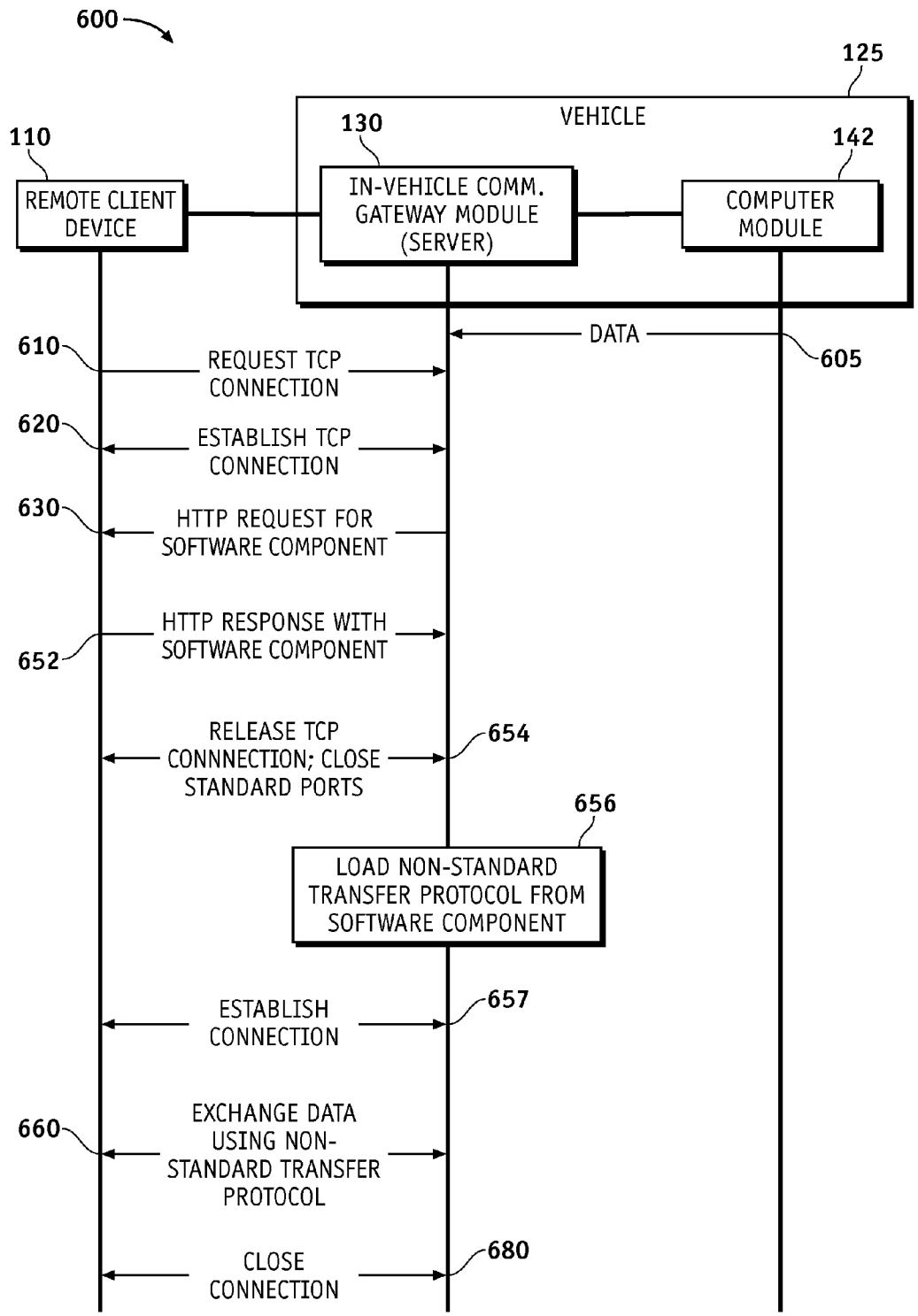
FIG. 6 is a simplified message flow diagram for exchanging data between the remote client device and the in-vehicle communications gateway module when an in-vehicle computer module pushes data to the remote client device in accordance with other embodiments of the invention.

FIG. 6 is a simplified message flow diagram 600 for exchanging data between the remote client device 110 and the in-vehicle communications gateway module 130 when an in-vehicle computer module 142 pushes data to the remote client device 110 in accordance with other embodiments of the invention. The scenario in FIG. 6 will be described with reference to a scenario where the computer module 142 in the vehicle 125 is transmitting or "pushing" data to the remote client device 110; however, it will be appreciated that the data exchange of FIG. 6 is not limited to that specific scenario. As noted above, the in-vehicle communications gateway module 130 can be implemented as part of a telematics module which is designed to manage communications between the computer module 142 inside the vehicle 125 and client devices 110. The in-vehicle communications gateway module 130 communicates with the computer module 142 using an in-vehicle network. The in-vehicle communications gateway module 130 hosts a server application 132, and the remote client device 110 hosts a browser application 112.

At step 605, the computer module 142 transmits or "pushes" data that is destined for the remote client device 110 to the in-vehicle communications gateway module 130 over an in-vehicle network. In other words, the computer module 142 sends data that is destined for the remote client device 110 without being requested to send that data. Notably, at step 605, any protocol can be used to exchange data between the in-vehicle communications gateway module 130 and the computer module 142 (i.e., it is not necessary to follow the particular, non-standard transfer protocol).

During initiation of a session between the in-vehicle communications gateway module 130 and the remote client device 110, at step 610, the remote client device 110 generates a TCP connection request and transmits it to a standard port of the in-vehicle communications gateway module 130. When the in-vehicle communications gateway module 130 receives the TCP connection request, at step 620, the remote client device 110 and in-vehicle communications gateway module 130 establish a TCP connection.

At step 630, the browser application 134 hosted at the in-vehicle communications gateway module 130 sends an HTTP request message to the server 114 hosted at the remote client device 110 to request a software component from the server 114. In response to the HTTP request message for the software component, at step 652, the remote client device 110 sends an HTTP response which includes the software component to the in-vehicle communications gateway module 130.

When the in-vehicle communications gateway module 130 receives the software component, at step 654, the in-vehicle communications gateway module 130 and the remote client device 110 close their respective standard HTTP ports and release their TCP connection. As noted above, this way "standard" internet protocols (i.e., HTTP-over-TCP-over-IP) are not used for the subsequent exchange of information between the in-vehicle communications gateway module 130 and the remote client device 110.

At step 656, browser application 134 at the in-vehicle communications gateway module 130 loads and executes the software component which includes the particular, non-standard transfer protocol module, and executes an executable program to enable communication between the remote client device 110 and the in-vehicle communications gateway module 130 in accordance with the particular, non-standard transfer protocol. At step 657, the remote client device 110 and the in-vehicle communications gateway module 130 establish a new connection according to the particular, non-standard transfer protocol.

After loading the particular, non-standard transfer protocol stack from the software component, the in-vehicle communications gateway module 130 is ready to communicate and exchange data with the remote client device 110 according to the particular, non-standard transfer protocol. At step 660, the server 132 at the in-vehicle communications gateway module 130 exchanges the data (which it received from the computer module 142 over the in-vehicle network) to the browser application 112 that is running at the remote client device 110 in accordance with the particular, non-standard transfer protocol. Once the data exchange is complete, at step 680, the remote client device 110 and the in-vehicle communications gateway module 130 close the connection.

Figure 7:
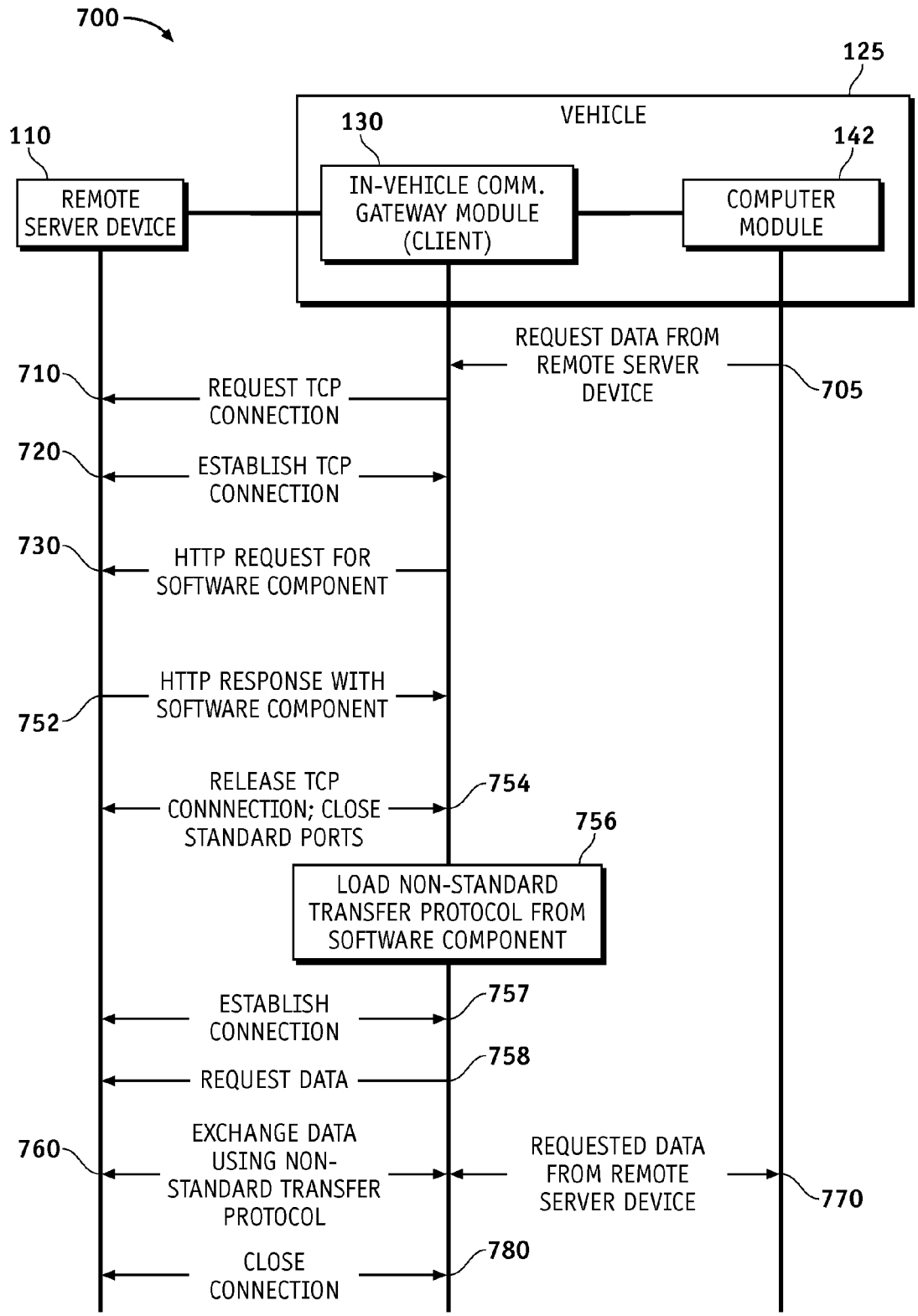
FIG. 7 is a simplified message flow diagram for exchanging data between a remote server device and an in-vehicle communications gateway module in accordance with some embodiments of the invention when an in-vehicle computer module requests data from the remote server device.

FIG. 7 is a simplified message flow diagram 700 for exchanging data between a remote server device 110 and an in-vehicle communications gateway module 130 in accordance with some embodiments of the invention when an in-vehicle computer module 142 requests data from the remote server device 110.

At step 705, the computer module 142 transmits a request for data to the in-vehicle communications gateway module 130 over an in-vehicle network. In other words, the computer module 142 unilaterally sends a request to the in-vehicle communications gateway module 130 to request data from the remote server device 110. Notably, at step 705, any protocol can be used to forward the request from the computer module 142 to the in-vehicle communications gateway module 130 (i.e., it is not necessary to follow the particular, non-standard transfer protocol).

In response to the request for data, a browser application 134 at the in-vehicle communications gateway module 130 initiates a session with the remote server device 110 by generating a TCP connection request, and transmitting the TCP connection request from a standard HTTP port of the in-vehicle communications gateway module 130 to the remote server device 110 at step 710. The remote server device 110 receives the TCP connection request at a standard HTTP port of the remote server device 110.

At step 720, the remote server device 110 and in-vehicle communications gateway module 130 establish a TCP connection. Thus, during session initiation, the in-vehicle communications gateway module 130 is used as a standard web interface.

At step 730, the browser application 134 of in-vehicle communications gateway module 130 sends an HTTP request message to the remote server device 110 to request the software from the remote server device 110.

In response to the HTTP request message for the software component, at step 752, the remote server device 110 sends a HTTP response message which includes the software component to the in-vehicle communications gateway module 130. As described above, the software component includes a particular, non-standard transfer protocol module.

When the in-vehicle communications gateway module 130 receives the software component from the remote server device 110, at step 754, the in-vehicle communications gateway module 130 closes its standard HTTP port to terminate the HTTP session and release the TCP connection. As noted above, this way "standard" internet protocols (the conventional HTTP/TCP/IP protocol stack of FIG. 2) are not used for the subsequent exchange of information between the in-vehicle communications gateway module 130 and the remote server device 110.

At step 756, browser application 134 at the in-vehicle communications gateway module 130 loads and executes the software component which includes the particular, non-standard transfer protocol module, and executes an executable program to enable communication with the remote server device 110 in accordance with the particular, non-standard transfer protocol. At step 757, the remote server device 110 and the in-vehicle communications gateway module 130 establish a new connection according to the particular, non-standard transfer protocol, and at step 758, the in-vehicle communications gateway module 130 then sends a message to the remote server device 110 to request a data exchange with the remote server device 110 according to the particular, non-standard transfer protocol.

At step 760, the remote server device 110 exchanges the requested data (initially requested by the computer module 142 over the in-vehicle network) with the browser application 134 that is running at the in-vehicle communications gateway module 130 in accordance with the particular, non-standard transfer protocol. At step 770, the in-vehicle communications gateway module 130 provides the requested data which it received from the remote server device 110 to the computer module 142. Notably, this exchange between in-vehicle communications gateway module 130 and the remote server device 110 does not require use of the non-standard transfer protocol.

Once the data exchange is complete, at step 780, the remote server device 110 and the in-vehicle communications gateway module 130 close the new connection.

Figure 8:
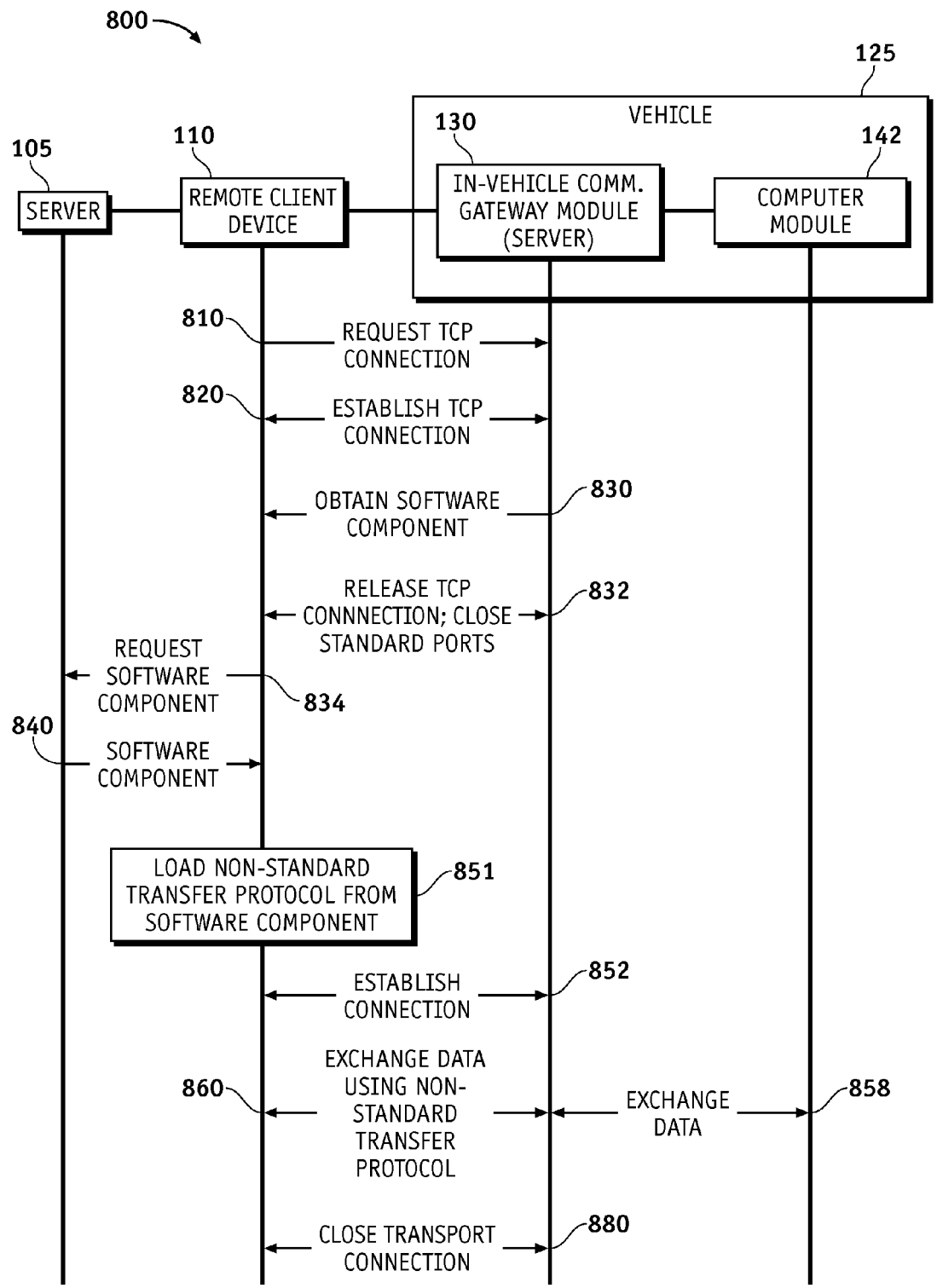
FIG. 8 is a simplified message flow diagram for exchanging data between an in-vehicle communications gateway module and a remote client device when the remote client device requests data from an in-vehicle computer module in accordance with other embodiments of the invention.

FIG. 8 is a simplified message flow diagram 800 for exchanging data between an in-vehicle communications gateway module 130 and a remote client device 110 when the remote client device 110 requests data from an in-vehicle computer module 142 in accordance with other embodiments of the invention. The scenario in FIG. 8 will be described with reference to a scenario where the client device 110 is requesting data from a computer module 142 in the vehicle 125; however, it will be appreciated that the data exchange of FIG. 8 is not limited to that specific scenario.

At step 810, the remote client device 110 sends a TCP connection request to the in-vehicle communications gateway module 130, and at step 820, the remote client device 110 and in-vehicle communications gateway module 130 establish a TCP connection. For example, the in-vehicle communications gateway module 130 receives a request for a HTTP service from the remote client device 110 on a standard port (e.g. HTTP port) of the in-vehicle communications gateway module 130, and the in-vehicle communications gateway module 130 and the remote client device 110 then establish a TCP connection. Techniques for establishing a TCP connection are well-known in the art and will not be described further herein.

At step 830, the in-vehicle communications gateway module 130 sends an instruction to the remote client device 110 to close its standard HTTP port and to obtain (i.e., download) a software component which includes a particular, non-standard transfer protocol module from an on-line server 105. At step 832, the in-vehicle communications gateway module 130 closes its standard HTTP port to terminate its TCP connection to the remote client device 110. This way "standard" internet protocols are not used for the subsequent exchange of information between the in-vehicle communications gateway module 130 and the remote client device 110.

In response to the instruction to download the software component from the on-line server 105, at step 834, the remote client device 110 sends a request to an on-line server 105 for the software component, and at step 840, the on-line server 105 sends the software component to the remote client device 110. As described above, the software component includes the particular, non-standard transfer protocol module.

At step 851, the remote client device 110 loads and executes the software component which includes the particular, non-standard transfer protocol module. After the remote client device 110 loads and executes the particular, non-standard transfer protocol module from the software component, the remote client device 110 is ready to communicate and exchange data with the in-vehicle communications gateway module 130 according to the particular, non-standard transfer protocol. At this point, the non-standard transfer protocol will be used during subsequent communications between the in-vehicle communications gateway module 130 and the remote client device 110.

At step 852, the remote client device 110 and the in-vehicle communications gateway module 130 establish a new connection according to the particular, non-standard transfer protocol.

The in-vehicle communications gateway module 130 communicates the data request to the computer module 142, and, at step 858, the computer module 142 and the in-vehicle communications gateway module 130 exchange the data over an in-vehicle network. Notably, at step 858, any protocol can be used to exchange data between the in-vehicle communications gateway module 130 and the computer module 142 (i.e., it is not necessary to follow the particular, non-standard transfer protocol module stack).

At step 860, the server 132 hosted at the in-vehicle communications gateway module 130 sends the data, which it received from the computer module 142, to the browser application 112 that running at the remote client device 110 in accordance with the particular, non-standard transfer protocol. Once the data exchange is complete, at step 880, the remote client device 110 and the in-vehicle communications gateway module 130 close the connection.

Thus, numerous embodiments have been described which can allow a remote device and an in-vehicle communication gateway module to exchange data without using HTTP-over-TCP-over-IP as the protocol for exchanging data between those entities. This allows for use of particular, non-standard transfer protocols and non-standard ports during data exchange in a telematics network.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for transmitting data from a computer module in a vehicle to a client device, the method comprising:
    receiving a request for a software component transmitted in accordance with a standard transfer protocol from the client device via a standard port at the in-vehicle communications gateway module, wherein the software component comprises a non-standard transfer protocol module that enables the in-vehicle communications gateway module to communicate data generated by the computer module to the client device;
    sending, in response to the request, the software component from the standard port of in-vehicle communications gateway module to the client device;
    loading the non-standard transfer protocol module at the client device so that the in-vehicle communications gateway module is capable of communicating the data to the client device according to the non-standard transfer protocol; and
    after the client device has loaded the non-standard transfer protocol, establishing a connection between the in-vehicle communications gateway module and the client device according to the non-standard transfer protocol, and then exchanging the data generated by the computer module between the in-vehicle communications gateway module and the client device according to the non-standard transfer protocol.

2. A method according to claim 1, further comprising:
    exchanging the data between the in-vehicle communications gateway module and the computer module; and
    delaying transmission of the data to the client device at the in-vehicle communications gateway module until the client device has loaded the non-standard transfer protocol.

3. A method according to claim 2, wherein the step of sending, in response to the request, the software component from the standard port of in-vehicle communications gateway module to the client device, comprises:
    sending, in response to the request, the software component from a server hosted at the in-vehicle communications gateway module via the standard port to a browser application hosted at the client device.

4. A method according to claim 1, further comprising:
    closing the standard port of the in-vehicle communications gateway module and a standard port of the client device so that standard transfer protocols are not used for the subsequent exchange of information between the in-vehicle communications gateway module and the client device.

5. A method according to claim 4, wherein the step of closing the standard port of the in-vehicle communications gateway module and a standard port of the client device, comprises:
    closing the standard port at the in-vehicle communications gateway module and the client device so that standard internet protocols are not used for the subsequent exchange of information between the server application hosted at the in-vehicle communications gateway module and the browser application hosted at the client device.

6. A method according to claim 1, further comprising:
    sending, in response to the request, a download request from a server hosted at the in-vehicle communications gateway module to a browser application hosted at the client device, wherein the download request requests that the client device download a software component from an on-line server;

sending, from the client device in response to the download request, a software component request message for the software component to the on-line server; and sending, from the on-line server in response to the software component request message, the software component to a browser application hosted at the client device.

7. A method according to claim 1, wherein the software component is used to establish the non-standard transfer protocol for communications between the server hosted at the in-vehicle communications gateway module and the browser application hosted at the remote client device, and wherein the software component comprises:

an executable program which includes the non-standard transfer protocol module which allows the browser application hosted at the remote client device to communicate with the server hosted at the in-vehicle communications gateway module according to the non-standard transfer protocol.

8. A method according to claim 7, wherein the browser application designed to execute the executable program to enable communication between the remote client device and the in-vehicle communications gateway module in accordance with the non-standard transfer protocol.

9. A method according to claim 7, wherein the software component comprises at least one of:

a compiled program;
a Java applet; and
an active X control.

10. An in-vehicle communication gateway module, comprising:

a server designed to:
receive, at a standard port, a request for a software component, wherein the request is transmitted from a browser application hosted at a client device in accordance with a standard transfer protocol, and to transmit, in response to the request, the software component to a client device via the standard port, wherein the software component comprises a non-standard transfer protocol module that enables the in-vehicle communications gateway module to communicate data generated by the computer module to the client device;

send, in response to the request for the software component, the software component from the standard port of in-vehicle communications gateway module to the client device;

establish a connection between the in-vehicle communications gateway module and the client device according to the non-standard transfer protocol, after the client device has loaded the non-standard transfer protocol so that the in-vehicle communications gateway module is capable of communicating the data to the client device according to the non-standard transfer protocol; and then exchange the data generated by the computer module between the in-vehicle communications gateway module and the client device according to the non-standard transfer protocol.

11. An in-vehicle communication gateway module according to claim 10, wherein the server is further designed to:

exchange the data received from the client device with a computer module in the vehicle; and delay transmission of the data to the client device at the in-vehicle communications gateway module until the client device has loaded the non-standard transfer protocol.

12. An in-vehicle communication gateway module according to claim 11, wherein the in-vehicle communication gateway module is designed to close the standard port after transmitting the software component so that standard transfer protocols are not used for subsequent exchange of information between the server application hosted at the in-vehicle communications gateway module and the browser application hosted at the client device.

13. An in-vehicle communication gateway module according to claim 10, wherein the in-vehicle communication gateway module is designed to establish the connection between the in-vehicle communications gateway module and the client device according to the non-standard transfer protocol before the in-vehicle communications gateway module exchanges data with the client device according to the non-standard transfer protocol.

14. An in-vehicle communication gateway module according to claim 13, wherein the in-vehicle communication gateway module is designed to close the connection between the in-vehicle communications gateway module and the client device according to the non-standard transfer protocol after the in-vehicle communications gateway module exchanges data with the client device according to the non-standard transfer protocol.

15. An in-vehicle communication gateway module, comprising:

a server designed to:
receive, at a standard port, a Transmission Control Protocol (TCP) request from a browser application hosted at a client device, and to transmit in accordance with a standard transfer protocol, in response to the request, a download request via the standard port which requests that the client device download a software component from an on-line server, wherein the software component comprises a non-standard transfer protocol module that enables the in-vehicle communications gateway module to communicate data generated by the computer module to the client device;

establish a connection between the in-vehicle communications gateway module and the client device according to the non-standard transfer protocol, after the client device has loaded the non-standard transfer protocol so that the in-vehicle communications gateway module is capable of communicating the data to the client device according to the non-standard transfer protocol; and then exchange the data generated by the computer module between the in-vehicle communications gateway module and the client device according to the non-standard transfer protocol.

16. An in-vehicle communication gateway module according to claim 15, wherein the server is further designed to:

exchange the data received from the client device with a computer module in the vehicle; and delay transmission of the data to the client device at the in-vehicle communications gateway module until the client device has loaded the non-standard transfer protocol.

17. An in-vehicle communication gateway module according to claim 16, wherein the in-vehicle communication gateway module is designed to close the standard port after transmitting the download request so that standard internet protocols are not used for subsequent exchange of information between the server application hosted at the in-vehicle communications gateway module and the browser application hosted at the client device.

18. An in-vehicle communication gateway module according to claim 15, wherein the in-vehicle communication gateway module is designed to establish the connection between the in-vehicle communications gateway module and the client device according to the non-standard transfer protocol before the in-vehicle communications gateway module exchanges data with the client device according to the non-standard transfer protocol, and wherein the in-vehicle communication gateway module is designed to close the connection between the in-vehicle communications gateway module and the client device according to the non-standard transfer protocol after the in-vehicle communications gateway module exchanges data with the client device according to the non-standard transfer protocol.

19. An in-vehicle communication gateway module according to claim 15, wherein the server is designed to transmit in accordance with a standard transfer protocol, in response to the request, the download request via the standard port to the browser application hosted at the client device, wherein the download request requests that the client device download the software component from the on-line server by sending a software component request message to the on-line server which requests that the on-line server transmit the software component to the browser application hosted at the client device.

* * * * *